United States Patent [19]
Holt et al.

[11] Patent Number: 5,644,746
[45] Date of Patent: Jul. 1, 1997

[54] DATA PROCESSING APPARATUS WITH IMPROVED MECHANISM FOR EXECUTING REGISTER-TO-REGISTER TRANSFER INSTRUCTIONS

[75] Inventors: Nicholas Peter Holt, Padfield; John Richard Eaton, Salford, both of United Kingdom

[73] Assignee: International Computers Limited, London, England

[21] Appl. No.: 876,965

[22] Filed: Apr. 30, 1992

[30] Foreign Application Priority Data

Jun. 13, 1991 [GB] United Kingdom ............... 9112754

[51] Int. Cl.$^6$ ........................................... G06F 9/30
[52] U.S. Cl. ........................ 395/393; 395/412; 395/800
[58] Field of Search ............................ 395/375, 250, 395/425, 800

[56] References Cited

U.S. PATENT DOCUMENTS

| 4,521,871 | 6/1985 | Galdun et al. ............... | 395/275 |
|---|---|---|---|
| 4,736,288 | 4/1988 | Shintani et al. .............. | 395/375 |
| 4,752,873 | 6/1988 | Shonai et al. ................ | 395/800 |
| 4,760,519 | 7/1988 | Papworth et al. ............. | 395/375 |
| 5,193,167 | 3/1993 | Sites et al. .................. | 395/425 |
| 5,197,132 | 3/1993 | Steely et al. ................ | 395/375 |

FOREIGN PATENT DOCUMENTS 0 061 586  10/1982  European Pat. Off. .
56-166553  12/1981  Japan .

OTHER PUBLICATIONS

Upper and Lower Bounds for One-Write Multivalued Regular Register by Chaudhuri et al, IEEE 1991 Publication (pp. 134-141).
Implementation of the PIPE processor, by Matthew K Farrens et al, Jan. 1991 Publication (pp.-65-70).
Bullions, "Resolving Store-Load Links in an Instruction Unit", IBM Technical Disclosure Bulletin, vol. 14, No. 3, Aug. 1971, pp. 868-869.
"High-Performance Register-to-Register Transfer Instructions," IBM Techncial Disclosure Bulletin, vol. 32, No. 11, Apr. 1990, pp. 368-369.

Primary Examiner—Parshotam S. Lall
Assistant Examiner—Zarni Maung
Attorney, Agent, or Firm—Lee, Mann, Smith, McWilliams, Sweeney & Ohlson

[57] ABSTRACT

A data processing apparatus, having a visible register map for associating physical registers with logical registers. Instructions involving register-to-register transfers are executed by altering the association between the physical registers and the logical registers, without actually transferring data between the registers, so as to avoid logically redundant operations and to take such instructions out of the critical path of execution.

3 Claims, 3 Drawing Sheets

5,644,746

DATA PROCESSING APPARATUS WITH IMPROVED MECHANISM FOR EXECUTING REGISTER-TO-REGISTER TRANSFER INSTRUCTIONS

BACKGROUND OF THE INVENTION

This invention relates to data processing apparatus.

It has been found that, in a typical data processing system, a large proportion of instructions merely move data between different storage and register locations and only a minority actually create new values. These data movements are logically redundant, and the object of the present invention is to provide a way of reducing the number of such data movements, so as to increase the performance and efficiency of the system.

SUMMARY OF THE INVENTION

According to the present invention there is provided a data processing apparatus comprising a plurality of physical registers, means for forming a mapping between the physical registers and a plurality of logical registers, and means for executing instructions involving register-to-register transfers by altering the mapping between the physical registers and the logical registers, without actually transferring data between the registers.

A further feature of the present invention is that since data movement instructions are executed solely by altering association information, such instructions can be executed before the contents of the source register have been computed. This eliminates the execution of such instructions from the critical path of execution.

DESCRIPTION OF THE EMBODIMENTS OF THE INVENTION

Two embodiments of the invention will now be described by way of example with reference to the accompanying drawings.

Figure 1:
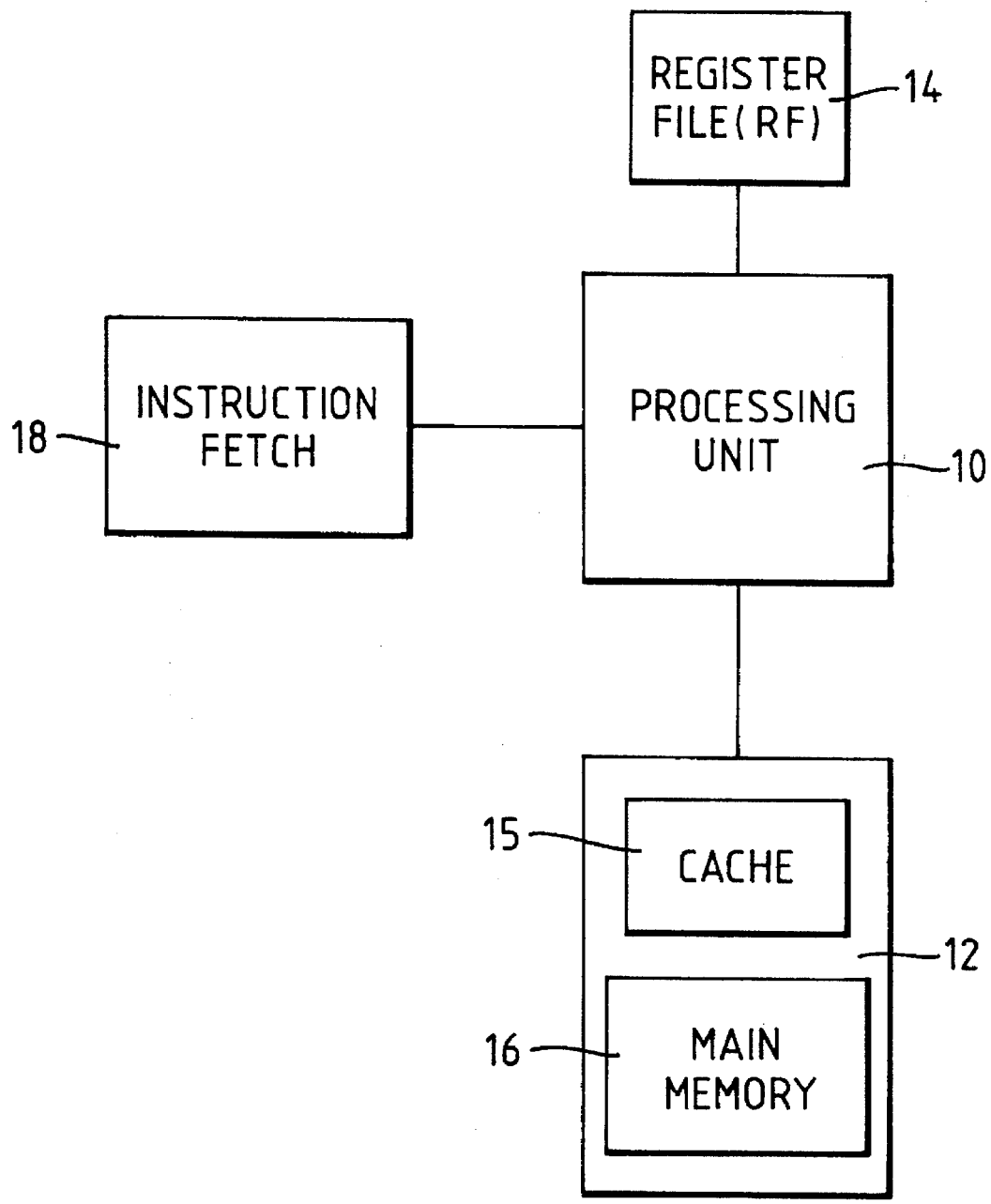
FIG. 1 is a schematic block diagram of a data processing apparatus in accordance with the invention.

Referring to FIG. 1, this shows a first data processing apparatus in accordance with the invention.

The apparatus comprises a processing unit 10, a memory 12, and a register file RF containing a set of physical hardware registers 14. The memory 12 is organised in a conventional manner as a combination of a main memory 15 and a cache memory 16.

The apparatus also includes an instruction fetch unit 18, which fetches sequences of instructions from the memory 12. These instructions can be grouped into four classes as follows:

ARITHMETIC: perform an arithmetic or logical operation on operands in specified source registers, and write the results into a specified destination register.

MOVE: logically move the contents of a specified register into another specified register.

LOAD: compute a memory address, by adding the value in one or more specified registers (and possibly a literal displacement value), read the memory at that address, and write the resulting value to a specified register.

STORE: compute a memory address by adding the value in or more specified registers (and possibly a literal displacement value), read a specified register, and write the resulting value to the memory at the calculated address.

Figure 2:
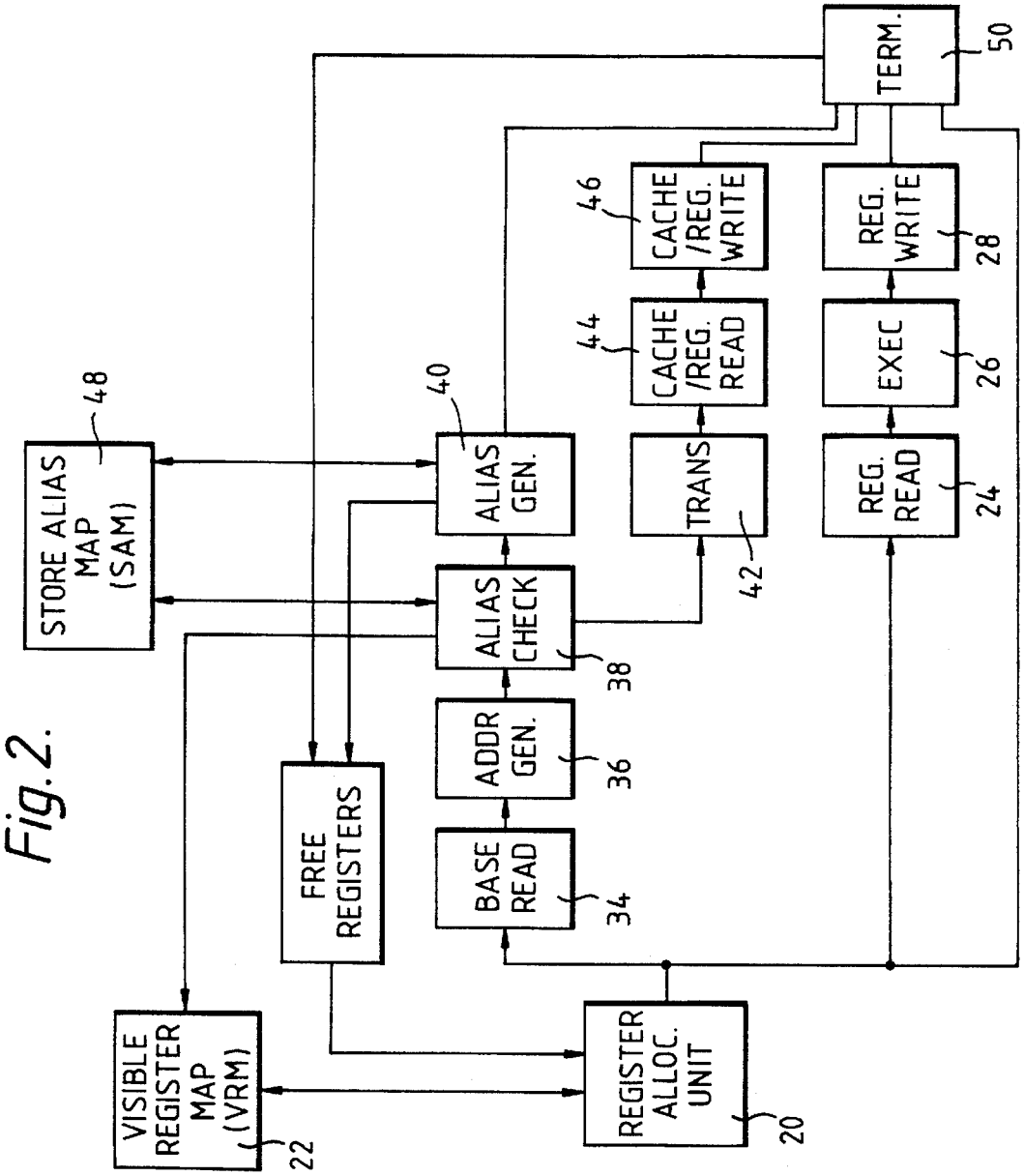
FIG. 2 shows the processing unit of the apparatus in more detail.

Referring now to FIG. 2, this shows the processing unit 10 in more detail. The instructions fetched by the instruction fetch unit are passed to a register allocation unit 20. This unit has access to a free register list 21 which holds a list of free (unallocated) physical registers, and to a visible register map (VRM) 22, which holds a table indicating associations between the physical (hardware) registers and the logical register identifiers used by the instructions.

The register allocation unit 20 can handle several instructions concurrently, and analyses these instructions to determine their register usage and dependencies. The unit allocates physical registers, if necessary, from the free register list 21, and modifies each instruction, using the VRM, so as to replace logical register identifiers in the instructions with physical register numbers.

The register allocation unit 20 also checks whether all the source registers (i.e., the physical registers containing the required operand or address values for the instruction) are valid and that a physical register can be allocated to hold the result of the instruction.

If a logical register identifier is mapped onto a physical register whose contents are not yet valid, then any instruction that requires to use the value in that logical register as a source operand cannot be scheduled until a prior instruction has been completed to write the required value to the physical register. As results are computed and written to the physical registers, any instructions awaiting these values become eligible for execution.

When an ARITHMETIC instruction becomes eligible for execution, it is passed to an execution pipeline comprising a register read stage 24, an execution stage 26, and a register write stage 28.

In the case of a MOVE instruction, the register allocation unit can immediately update the VRM so that the destination register identifier is now mapped onto the same physical register as the source register identifier. No further processing of the instruction is required.

Note that it is not necessary for the value in the source register to have been previously computed for such a MOVE instruction to be executed: only register identifiers are manipulated.

If a value is loaded into a logical register, and subsequently another logical register is associated with the same value (as the result of a MOVE instruction), both logical registers are now associated with the same physical register. If either of the original logical registers is now modified, a new physical register must be allocated for it, and the association information in the VRM updated accordingly.

STORE and LOAD instructions are processed by means of an address calculation pipeline and a memory access pipeline. The address calculation pipeline consists of a base register read stage 34, an address generation stage 36, an alias check stage 38, and an alias generation stage 40. The memory access pipeline comprises an address translation stage 42, a cache/register read stage 44, and a cache/register write stage 46. The alias check and alias generation stages 38, 40 have access to a store alias map (SAM) 48 which is a table indicating a mapping between memory addresses and physical registers.

In the case of a STORE instruction, the alias generation stage 40 makes an entry in the SAM 48 to indicate that the contents of the store at the calculated address can now be found in the physical register to which the source register specified in the instruction is mapped. This allows subsequent instructions to access the data without the need for a memory access. If the calculated address corresponds to an existing entry in the SAM, the old association is removed, and the corresponding physical register then becomes free, and is added to the free register list 21.

As in the case of MOVE instructions, it is not necessary for the value in the source register to have been previously computed before creation or update of a SAM entry. However, the value will be required before an update of memory or cache store can take place.

In the case of a LOAD instruction, the alias check stage 38 determines whether there is an existing entry for the addressed location in the SAM. If not, an entry is generated in the SAM, associating the calculated address with the physical register identified as the destination of the load instruction. When the store data returns from the read stage 44, it is stored in this physical register, and any dependencies associated with this register are released.

If, on the other hand, there is an existing entry for the addressed location in the SAM, this means that the data from the required store location is already held in a physical register. In this case, the VRM is updated by the alias check stage 38, to map the destination register identifier to this physical register. As a result, no memory access is necessary.

It can therefore be seen that the allocation of a destination physical register to a LOAD instruction by the register allocation unit 20 is only provisional, and may be modified subsequently by the address generation pipeline after it has performed this check. Any following instructions that use this destination register as a source must therefore wait until this provisional allocation is confirmed (where there is no existing entry in the SAM) or rescinded (where there is an existing entry in the SAM).

In the case where the provisional allocation is rescinded, the following actions are performed by the address generation pipeline:

(a) The VRM is updated so that the destination register of the LOAD instruction is mapped to the physical register containing contents of the addressed store location.
(b) All instructions containing a reference to the physical register to which the destination register of the LOAD instruction was originally mapped are modified to include the correct physical register number.
(c) The original physical register is de-allocated, and added to the free register list 21.

The processing unit also includes a termination stage 50 which detects the successful termination of instructions, and records the most recent guaranteed correct state of the processing apparatus. The termination stage also identifies any physical registers that are eligible to be re-used (where all instructions that could have made reference to a register have now been successfully completed) and adds those registers to the list 21 of free registers. This list 21 can be accessed by the register allocation unit when it requires to allocate a new physical register.

A second data processing apparatus in accordance with the invention will now be described.

Figure 3:
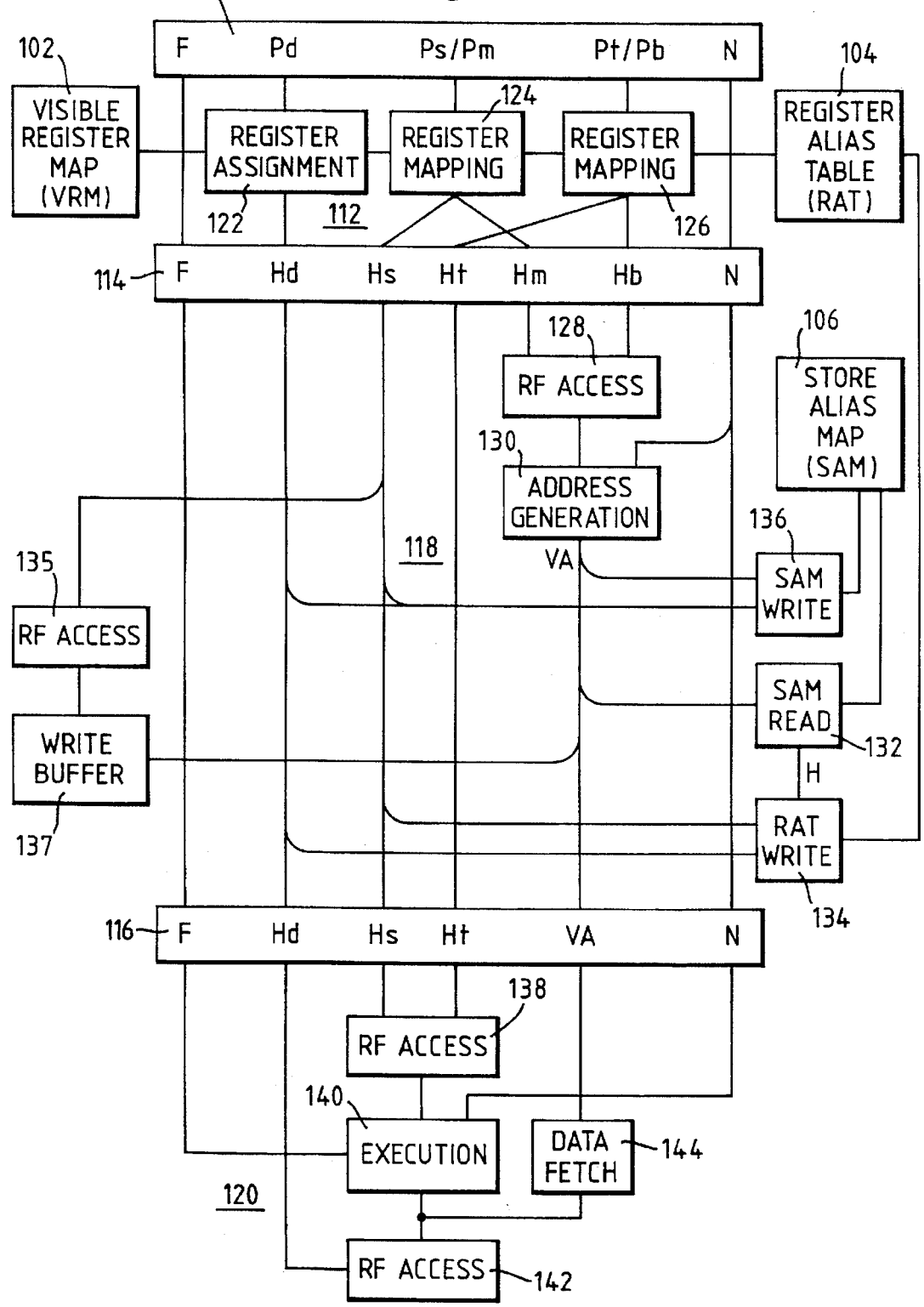
FIG. 3 shows an alternative form of the processing unit.

The overall organisation for this apparatus is the same as shown in FIG. 1. FIG. 3 shows the processing unit in more detail.

The processing unit contains the following tables:

Visible register map (VRM) 102: this is a table indicating mapping between the physical (hardware) registers and the logical register identifiers used by the instructions.

Register alias table (RAT) 104: this contains a table indicating mapping between the physical registers. The RAT effectively modifies the mapping specified by the VRM, by indicating that the logical register mapped on to a particular physical register is now mapped on to a different physical register.

Store alias map (SAM) 106: this contains a table indicating mapping between virtual memory addresses contained in the instructions and the physical registers.

Instructions received from the instruction fetch unit are held in a buffer 110. The buffer contains the following fields:

F: function code
Pd: logical destination register
Ps/Pm: logical source or modifier register
Pt/Pb: logical source or base register
N: literal value The instructions in the buffer 110 are transformed by a register allocation stage 112, and the transformed instruction is placed in a buffer 114. The transformed instruction includes the following fields:

F: function code
Hd: hardware destination register
Hs/Ht: hardware source registers
Hm: hardware modifier register
Hb: hardware base register
N: literal value A further buffer 116 receives the values F, Hd, Hs, Ht and N from the buffer 114, and also a virtual address VA which is generated from Hb, Hm and N by an address generation stage 118.

Finally, the contents of the buffer 116 are processed by an execution and data fetch stage 120.

The register allocation stage 112 comprises the following units:

Register assignment unit 122. This assigns a hardware register to Pd, and updates the VRM table. The register assignment unit maintains a list of free hardware registers (not shown) which are available for assigning.

First register mapping unit 124. This maps Ps/Pm onto a hardware register (Hs or Hm) using the VRM and RAT tables.

Second register mapping unit 126. This maps Pt/Pb onto a hardware register (Ht or Hb) using the VRM and RAT tables.

The address generation stage 118 comprises the following units:

Register file access unit 128. This uses the field Hb or Hm to access the register file RF to obtain a base or modifier value.

Address generation unit 130. This uses the base or modifier and the literal value N to calculate the virtual address VA.

VAT read unit 132. This uses the VA to read the SAM to determine whether a hardware register H is already associated with this particular VA. If so, this is referred to as a SAM hit; otherwise, a SAM miss has occurred.

RAT write unit 134. This uses the value H, in the event of a SAM hit, to form an association in the RAT table between Hd and H.

SAM write unit 136. This uses the VA and the field Hd or Hs to form a new entry in the SAM, associating this virtual address with the hardware register Hd or Hs.

Register file access unit 135. This uses the field Hs to access the register file RF to obtain a data item.

Write buffer 137. This receives the virtual address VA, and receives the data item from the RF and writes it to the memory at address VA.

The execution stage 120 comprises the following units:

Register file access unit 138. This receives the field Hs or Ht and accesses the register file RF to obtain a source operand or operands.

Execution unit 140. This receives the source operand(s) and/or the literal N, and performs an arithmetic or logical function as specified by the function code F.

Register file access unit 142. This receives the result of the function, and writes it to the hardware register specified by Hd.

Data fetch unit 144. This receives the virtual address VA and accesses the memory at this address, to read a data item. The data item is passed to the register file access unit 142 for writing to the hardware destination register Hd.

The operation of the apparatus in response to the different instruction types will now be described.

L Pd/(Pb+N)

This instruction indicates that the virtual address is to be calculated by adding the contents of a logical base register Pb to a literal value N. The memory is then to be accessed, using this virtual address, and the data is to be loaded into logical destination register Pd.

In this case, the unit 122 assigns a free hardware register Hd as the destination register, and updates the VRM so as to associate this with the logical register Pd. At the same time, the unit 126 consults the RAT and VRM, to find the hardware register Hb which corresponds to logical register Pb.

The value Hb is used by the unit 128 to access the RF so as to obtain the base value. This base value is then added by the unit 130 to the literal value N, so as to generate the virtual address VA.

The virtual VA is used by the unit 132 to access the SAM map to determine whether VA is already associated with any hardware register. In the event of a SAM miss, the VA is passed to the data fetch unit 144, so as to initiate fetching of the required data from the memory. This data is then written, by the unit 142, into the destination register Hd in the register file. At the same time, VA and Hd are sent to the unit 136, which creates a new entry in the SAM, associating VA with Hd.

In the event of a SAM hit, the unit 132 returns a value H which identifies a hardware register holding the required data value. Hence, a memory access is unnecessary and the instruction does not pass to the execution stage 120. The values H and Hd are used by the unit 134 to form an association between the register H and the destination register Hd. Hence, it is not necessary in this case actually to write the data into the destination register.

ST/Ps (Pb+N)

This instruction specifies that a virtual address is to be formed by adding the contents of logical base register Pb to literal value N. The contents of logical source register Ps are then written to the memory at this address.

The values Ps and Pb are used by the mapping units 124 and 126 to access the RAT and VRM to find the hardware registers Hs and Hb which hold the source operand and base value.

Hb is used by the unit 128 to access the RF to obtain the base value, and this is added to the literal N by unit 130, to form the virtual address VA.

Hs is used by the unit 135 to access the RF to obtain the source operand, and this is then written to the memory location specified by VA, by way of the write buffer.

At the same time, the VA is used by the unit 132 to access the SAM table to determine whether this virtual address is already associated with one of the hardware registers.

If no association exists, the unit 136 creates a new entry in the SAM associating the VA with the hardware source register Hs. If, on the other hand, an association already exists (SAM hit), the existing entry is overwritten with the new entry.

FUN Pd/Ps, Pt

This instruction indicates that an arithmetic or logical operation, specified by the function code FUN, is to be performed on source operands in logical registers Ps and Pt, and the result written into logical register Pd.

The unit 122 assigns a free hardware register Hd as the destination register, and updates the VRM table to associate this with the logical register Pd. At the same time, the units 124 and 126 access the RAT and VRM tables find the hardware registers Hs, Ht associated with Ps, Pt.

The unit 138 then uses the values Hs, Ht to access the RF to obtain the operands, and the specified function is performed by the unit 140. The result is written into hardware register Hd by the unit 142.

M Pd/Ps

This instruction specifies that the contents of logical register Ps are to be moved to logical register Pd.

In this case, the unit 122 assigns a hardware register Hd as the destination register, and updates the VRM to associate this with the logical register Pd.

At the same time, the unit 124 accesses the RAT and VRM to find which hardware register Hs is associated with Ps.

Finally the unit 134 uses these values Hs, Hd to create a new entry in the RAT, associating the registers Hs and Hd.

Thus, it can be seen that in this case, no actual movement of data between the register is required—only the associations between the registers are changed.

In summary, it can be seen that in this apparatus, the number of logically redundant operations (which do not create new values) is minimised, with a corresponding reduction in the critical paths of programs. This is achieved by the use of tables in such a manner that, wherever possible, data movements are implemented by changing the associations between hardware registers on the one hand and logical registers and virtual addresses on the other.

We claim:

1. A data processing apparatus comprising:

(a) a plurality of physical registers, (b) a mapping table for mapping a plurality of logical registers on to said physical registers, (c) means for fetching a sequence of instructions, said instructions including a MOVE instruction for moving an operand from a logical source register to a logical destination register, said logical source register being mapped on to one of said physical registers, and (d) execution means for executing said instructions, the execution means including means for executing said MOVE instruction by modifying said mapping table to map said logical destination register on to said one of said physical registers.

2. A data processing system according to claim 1, further including a main memory comprising a plurality of locations, and a memory mapping table for mapping said physical registers on to said locations.

3. A data processing system according to claim 1 wherein said instructions further include a LOAD instruction for loading an operand from said main memory into a specified logical destination register, and wherein said execution means comprises means for executing said LOAD instruction by consulting said memory mapping table to determine whether said operand is already present in one of said physical registers and, when said operand is present, modifying said mapping table to map said specified logical destination register on to said one of said physical registers.

* * * * *